May 3, 1960 R. D. KODIS ET AL 2,935,735

MAGNETIC CONTROL SYSTEMS

Filed March 8, 1955 2 Sheets-Sheet 1

INVENTORS
ROBERT D. KODIS
SMIL RUHMAN
SADIA S. GUTERMAN
BY Elmer J. Gorn
ATTORNEY May 3, 1960 R. D. KODIS ET AL 2,935,735

MAGNETIC CONTROL SYSTEMS

Filed March 8, 1955 2 Sheets-Sheet 2

INVENTORS
ROBERT D. KODIS
SMIL RUHMAN
SADIA S. GUTERMAN

BY [signature]
ATTORNEY

United States Patent Office 2,935,735

Patented May 3, 1960

2,935,735

MAGNETIC CONTROL SYSTEMS

Robert D. Kodis, Brookline, Smil Ruhman, Waltham, and Sadia S. Guterman, Dorchester, Mass., assignors to Raytheon Company, a corporation of Delaware Application March 8, 1955, Serial No. 493,032

15 Claims. (Cl. 340—174)

This invention relates to magnetic control systems, and particularly to the storage and transmission of electrical energy representative of numerical digits to be counted or informational or logical components to be utilized in a computing operation or in a machine or apparatus for controlling functional sequences.

The invention is characterized by the incorporation of novel selective storage means into one or more signal-establishing units of a saturable core type of magnetic signal system, so that any given informational signal may be caused to return repeatedly (in feedback fashion) for continued storage in such signal-establishing unit, or the storage of such signal may be terminated whenever desired, by application of a storage-terminating signal to such unit. Thus the novel selective storage means of the present invention makes it possible to obtain, with the use of relatively simple saturable core circuitry, a controllable flexibility in the handling of signals that is comparable to the flexibility heretofore achievable only by resorting to the more complex bi-stable multivibrator ("flip-flop") circuitry that is a conventional part of electronic tube computer systems.

In one specific application, for example, the invention makes possible the above-described selectivity of operation of the component cores of a magnetic core system, (*a*) by providing each saturable core of such a core system with at least two signal input circuits, as contrasted with the single input circuit heretofore employed, and (*b*) by causing one or the other, or both such circuits to carry input energy, in a given actuation period, in accordance with the requirements of the logical pattern to be entered or retained in the respective cores.

Figure 1:
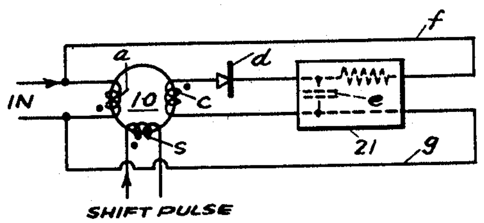
Figure 2:
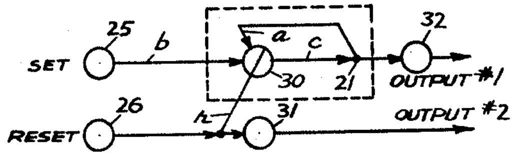
Figure 2A:
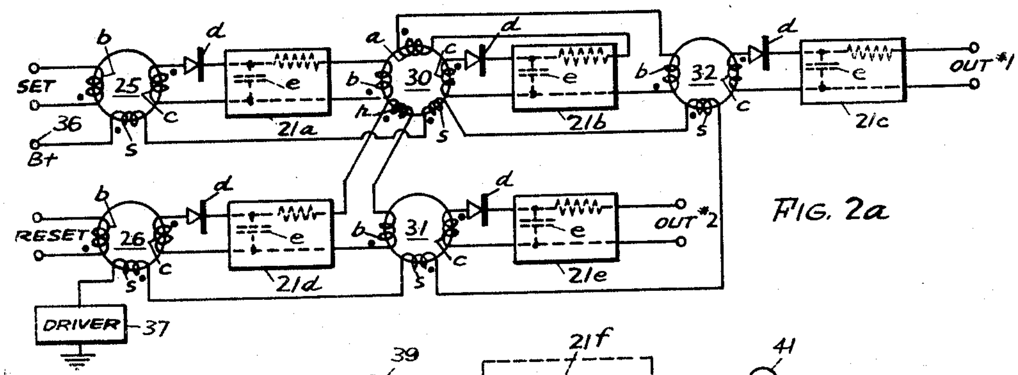
Figure 3:
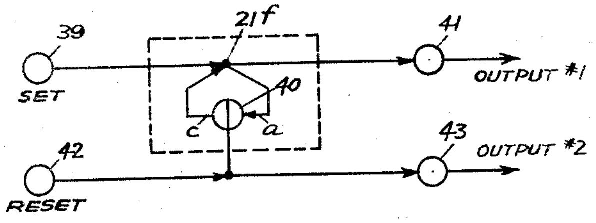
Figure 3A:
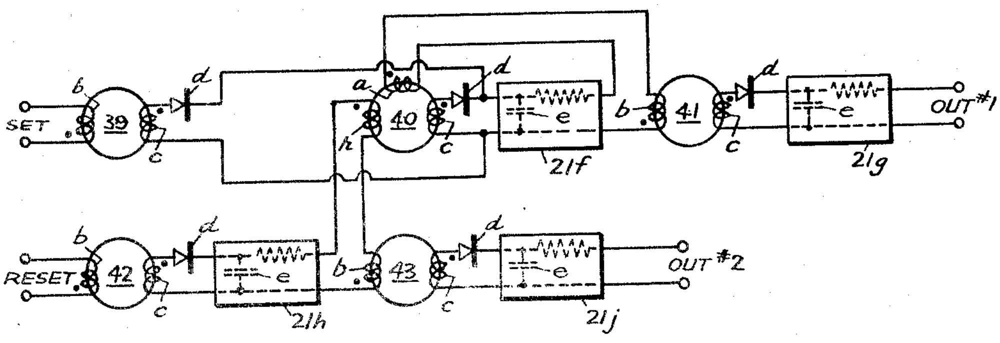
Figures 4, 4A, 5, 6:
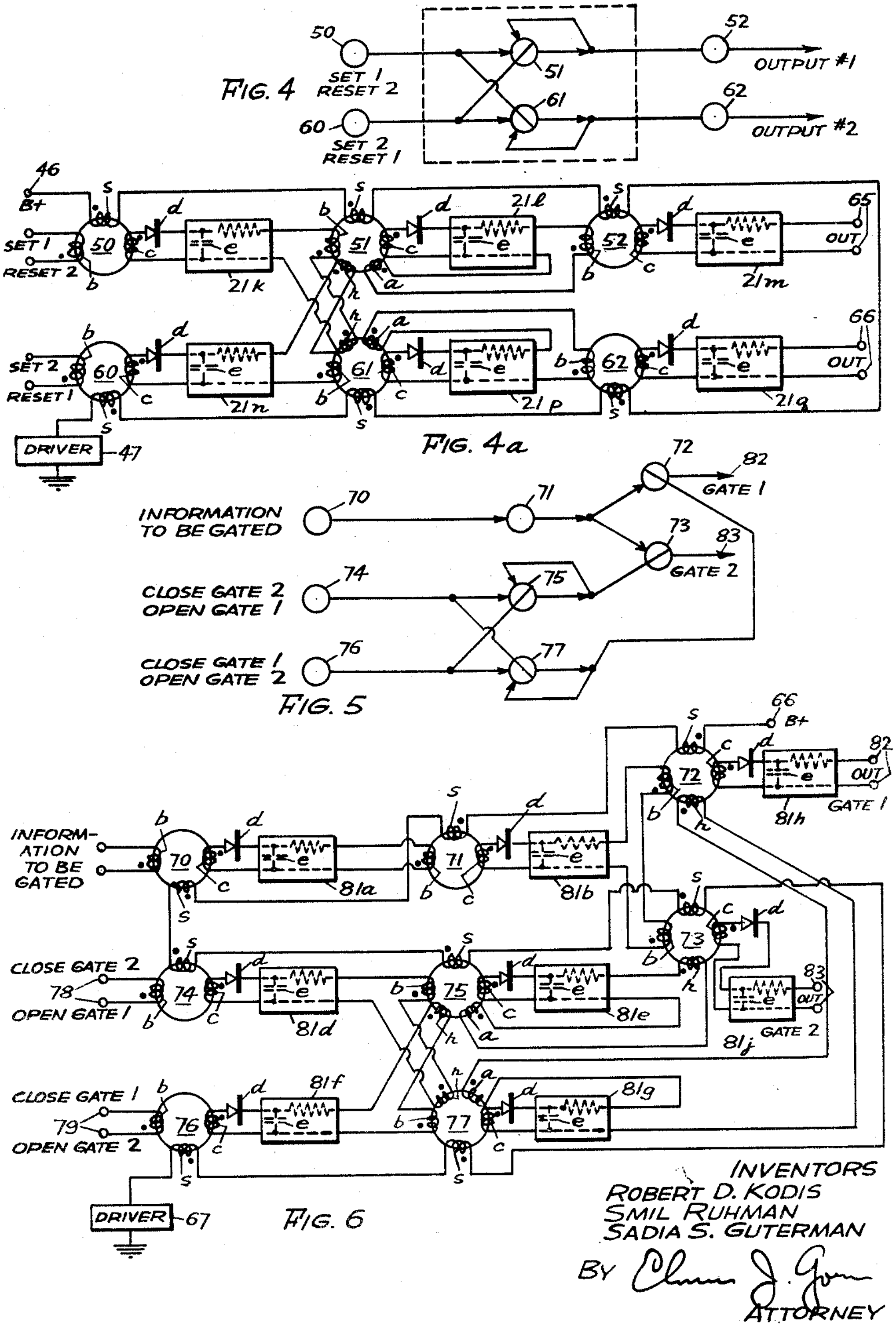

These and other characteristics of the invention will be apparent as the description thereof progresses, reference being had to the accompanying drawings wherein:

Fig. 1 is an electrical diagram showing a basic principle of the invention as it affects the information-representing condition established in a single stage of a saturable core system;

Figs. 2, 3, and 4 are schematic illustrations of three applications of the invention;

Figs. 2*a*, 3*a*, and 4*a* are diagrams of electrical connections for the schemes of Figs. 2, 3, and 4, respectively;

Fig. 5 shows a logical pattern embodying a particular arrangement of components of the kind illustrated in Figs. 2 and 2*a*; and Fig. 6 shows electrical connections conforming to the Fig. 5 pattern.

Referring first to Fig. 1, the core 10 is of ferromagnetic material having high magnetic retentivity and a relatively open hysteresis loop characteristic, preferably approaching the rectangular in shape, so that when the core is magnetized to a condition of flux saturation of one polarity, it tends to remain in such state, with which may be associated a particular digital value, such as the binary digit "1," until the direction of flux saturation is reversed, as by application of a "shift pulse" of the correct polarity to produce such reversal of saturation. Winding "*a*" of core 10 may be utilized for "writing into" the core a "1" digital value, by driving the core to saturation in one polar direction, and thereafter a shift pulse of opposite polarity may be applied through winding "*s*," to drive the core back to its opposite saturation polarity. During this reverse saturating process there will be generated an output current in winding "*c*," which current will be temporarily stored in a delay network 21 including a condenser "*e*" to which it passes by way of unidirectional impedance diode "*d*," the delay interval established by network 21 being designed to be sufficient to overlap the period required for completion of the saturation-reversing process.

The ensuing discharge of condenser "*e*" causes a return flow of the signal-representing current back to winding "*a*" of core 10, by way of feedback line *f*—*g*, where it is again effective to "write into" core 10 the same signal value previously "read out" of said core. This reading-out and feeding-back cycle will be repeated each time a new shift pulse (of proper polarity) is applied to "shift" winding "*s*" and on each such reading-out there will be reentered in core 10 the signal (digital value, for example) represented by such action. Thus the said signal may be read out of core 10 repeatedly without loss, so that the result is analogous to the operation of an electronic multivibrator circuit of the "flip-flop" type, which is repeatedly conductive in each of the two stable states to which it is successively driven. The described reading-out and reentry of the signal may be considered a continuing "storage" of the signal, since the core recaptures its signal-holding condition during each signal operating interval. The positions of the dots adjacent each winding indicate that the direction of field of coil "*s*," for example, is opposite to that of coil "*a*," so that the desired reversal of flux saturation polarity will occur when a shift pulse flows through coil "*s*," following delivery of an input signal by way of coil "*a*"; and, also, so that the process of flux saturation reversal will cause generation of current in coil "*c*" in the proper direction, namely, in the direction for flow through diode "*d*" to condenser "*e*."

The saturable core flip-flop concept embodied in the structure of Fig. 1 is of great practical value in a multiple core system, wherein each core (representing a stage of a shift register or analogous multiple core combination) is actuated by the output of a preceding core, and, in turn, feeds its output to another core or cores of the combination. Under such conditions the input ("set") signals and the feedback signals may be buffered on the respective cores, as indicated at 30*b* and 30*a*, respectively, in Figs. 2 and 2*a*, or on the delay network by means of unidirectional diodes in the output circuits of successive cores, as indicated at 21*f* in Figs. 3 and 3*a*.

To terminate the flip-flop cycle in either the Fig. 2*a* or the Fig. 3*a* arrangement, there is provided an additional winding "*r*," termed a "reset" winding, on the core 30 of Fig. 2*a* and on the corresponding core 40 of Fig. 3*a*. As indicated by the positions of the respective dots, these reset windings "*r*" of the cores 30 and 40, respectively, are wound to have a magnetizing effect opposite to that of the feedback receiving windings "*a*" of said cores 30 and 40; hence, whenever energy is delivered to such a reset winding concurrently with energy feedback to winding "*a*," the result is an inhibiting of the saturation reversing effect normally attendant upon such feed-back process, and in consequence of such inhibiting effect the flip-flop cycle terminates and can be restarted (in the Fig. 2*a* arrangement) only by delivery to winding "*b*" of a new "set" pulse. The cycle can be restarted, in the Fig. 3*a* arrangement, by delivery of a new "set" pulse to the feedback circuit including winding "*a*" of core 40, which pulse would be generated in winding "*c*" of the companion core 39, as by application of a recycle-initiating pulse to winding "b" of said core 39.

Two cores having buffering "set" and return windings arranged as indicated in Figs. 2 and 2a may be interconnected, as indicated in Figs. 4 and 4a, for the purpose of establishing a dual selection pattern having selection capabilities analogous to those of a single-pole double-throw switch. In such an arrangement, an operating pulse delivered by way of the output circuit of core 50 will enter windings 51b and 61r simultaneously, to "set" core 51 and "reset" core 61. That is to say, the energy thus flowing to core 61 via winding 61r will inhibit the action of the feedback energy received in winding 61a (assuming such energy to be present) and will thereby terminate the "flip-flop" cycle preexisting in the circuit of core 61. At the same time a new flip-flop cycle will be initiated in the circuit of core 51, since feedback winding 51a is uninhibited, due to the absence of any energy flow into winding 51r. Hence there will be an output (after the next shift pulse) at terminals 65, but a termination of output at terminals 66. The operations just described may be reversed (to produce continuing output at terminals 66 and termination of output at terminals 65) by applying the control signal to core 60 rather than to core 50. All cores of Fig. 4a carry the usual shift winding "s" for producing the progressive transfer of the signal energy from core to core, in the manner illustrated in Fig. 2a. The same is true of the cores of Fig. 3a, where such shift windings have been omitted, to improve the clarity of the illustration.

An example of one use of the Fig. 4 dual selection pattern is presented in Fig. 5, with the actual circuit connections being shown in Fig. 6. Information to be "switched" into a "gate 1" or a "gate 2" is branched from a core 71 to a pair of cores 72 and 73, one or the other of which, according to the selection indicated by signal input at one of the control points 78, 79, will be inhibited by energy flow into its inhibiting winding, 72r or 73r, as the case may be, the former being in series with the flip-flop feedback circuit of control core 77, and the latter in series with the corresponding circuit of control core 75. The core that is not inhibited, in any given pulse shift period, will pass a signal to its output terminals 82 or 83, as the case may be, and will continue to do so in each succeeding pulse-shift period, until such time as there is produced a termination of the prevailing flip-flop cycle by delivery of a new control pulse to the alternate input terminals (79, or 78, as the case may be). All cores carry the usual shift winding "s," as in the circuits heretofore described, as well as the usual input and output windings "b" and "c," respectively.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. In a magnetic control system, a saturable magnetic core of material having high magnetic retentivity and having an output winding, means for reversing the direction of flux saturation in said core, and thereby generating a current in said output winding, means operated by said generated current for immediately restoring said core to its preexisting direction of flux saturation, and winding means on said saturable magnetic core for selectively inhibiting said restoring means.

2. In a magnetic control system, a saturable magnetic core of material having high magnetic retentivity and having an input winding, an actuation winding, and an output winding in which current is generated in response to the magnetic field reversal produced by delivery of current to said actuation winding, means for directly feeding back to said input winding the current generated in said output winding, to cause a second reversal of the magnetic field embracing said core, and winding means on said saturable magnetic core for selectively inhibiting said second reversal of said magnetic field.

3. In a magnetic control system, a magnetic flux-sustaining element having an output circuit associated therewith, means for producing a flux change in said element and thereby causing current flow in said output circuit at the beginning of an operative cycle, means responsive to said current flow for producing a second flux change in said flux-sustaining element before termination of said operative cycle, and winding means on said magnetic flux-sustaining element for selectively inhibiting said second flux change.

4. In a magnetic control system, a magnetic flux-sustaining element, and means responsive to a first flux change in said element for producing a second flux change therein, and winding means on said magnetic flux-sustaining element for selectively inhibiting said second flux change.

5. In a magnetic control system, a magnetic flux-sustaining element, looped-circuit means responsive to a first flux change in said element for producing a second flux change therein at the completion of the first flux change, and winding means on said magnetic flux-sustaining element for selectively inhibiting said second flux change.

6. In a magnetic control system, first and second magnetic flux-sustaining elements having input and output feedback; inhibit windings associated therewith, means for producing a flux change in said first magnetic flux-sustaining element and thereby causing current flow in said first output winding, means for directing said current flow back to said feedback winding of said first flux-sustaining element to produce a second flux change in said first flux-sustaining element, said first inhibit winding connected in series with said input winding of said second flux-sustaining element for inhibiting the magnetic effect of feedback current in said first flux-sustaining element when and only when said input winding of said second flux-sustaining element is energized, and means for directing current flow in said second input winding.

7. In a magnetic control system, a plurality of magnetic flux-sustaining elements having input and output windings associated therewith, means including a third winding associated with said flux-sustaining elements for producing a flux change in said elements thereby causing current flow in said output windings, the output winding of each magnetic flux-sustaining element connected to the input winding of the succeeding magnetic flux-sustaining element, and means in circuit with the output winding of said first magnetic flux-sustaining element for directing said current flow back to said input winding of said first of said magnetic flux-sustaining elements to produce a second flux change in said flux-sustaining element during the operative cycle initiated by a flux change in said input winding.

8. In a magnetic control system, a magnetic flux-sustaining element having first and second input windings and output windings associated therewith, means for producing a flux change in said element and thereby causing current flow in said output winding, means including a delay network for directing said current flow back to said second input winding to produce a second flux change in said flux-sustaining element, and winding means on said magnetic-flux sustaining element for inhibiting said second flux change.

9. In a magnetic control system, a magnetic flux-sustaining element having input and output windings associated therewith, means for producing a flux change in said element and thereby causing current flow in said output winding, means for directing said current flow back to said input winding to produce a second flux change in said flux-sustaining element, and winding means on said flux-sustaining element for selectively inhibiting said second flux change.

10. In a magnetic control system, a magnetic flux-sustaining element of material having high magnetic retentivity, means for entering a signal in said magnetic flux-sustaining element, means for applying signal shifting energy to said magnetic flux-sustaining element, means directly coacting with said signal shifting means for reentering the storage of an entered signal in said magnetic flux-sustaining element notwithstanding operation of said signal shifting means, and separate inhibit means for terminating the storage of said entered signal.

11. In a magnetic control system, a saturable core of material having high magnetic retentivity and carrying input, output and shift windings, means for causing energy flow in said input winding and thereby producing flux saturation in one polarity, means for causing energy flow in said shift winding and thereby causing flux saturation in the opposite polarity, means including a feedback winding in circuit with said output winding for returning said core to a condition of flux saturation in said first-named polarity, and inhibiting means including a winding of polarity opposite to that of said feedback winding for selectively preventing a return of said core to a condition of flux saturation in said first-named polarity.

12. In a magnetic control system, first and second saturable cores of material having high magnetic retentivity carrying input, output and shift windings, means for causing energy flow in said first core input winding and thereby producing flux saturation in one polarity, means for causing energy flow in said first core shift winding and thereby causing flux saturation in the opposite polarity, means in series with said output winding of said first core and the input winding of said second core for returning said first core to a condition of flux saturation in said first-named polarity within a predetermined time interval following energy flow in said shift winding, and winding means on said first saturable core for selectively inhibiting the return of said first core to said first-named polarity.

13. In a magnetic control system, a saturable core of material having high magnetic retentivity and carrying input, output and shift windings, means for causing energy flow in said input winding and thereby producing flux saturation in one polarity, means for causing energy flow in said shift winding and thereby causing flux saturation in the opposite polarity, and energy feedback means including a feedback winding of opposite polarity in series with said output winding for returning said core to a condition of flux saturation in said first-named polarity, and winding means on said saturable core for selectively inhibiting the return of said saturable core to said first-named polarity.

14. In a magnetic control system, a saturable core of material having high magnetic retentivity and carrying input, output and shift windings, means for causing energy flow in said input winding and thereby producing flux saturation in one polarity, means for causing energy flow in said shift winding and thereby causing flux saturation in the opposite polarity, energy feedback means in circuit with said output winding and fed solely thereby for returning said core to a condition of flux saturation in said first-named polarity within a predetermined time interval following energy flow in said shift winding, and winding means on said saturable core for selectively inhibiting said energy feedback means.

15. In a magnetic control system, first and second saturable cores of material having a high magnetic retentivity carrying input, output and shift windings, means for causing energy flow in said input winding of said first saturable core and thereby producing flux saturation in one polarity, means for causing energy flow in said shift winding of said first saturable core and thereby causing flux saturation in the opposite polarity, the output winding of said first saturable core connected in circuit with the input winding of said second saturable core and additional winding means in series with the input winding of said second saturable core for returning said first saturable core to a condition of flux saturation in said first-named polarity during a flux change in said second saturable core.

References Cited in the file of this patent

UNITED STATES PATENTS

| | | |
|---|---|---|
| 2,652,501 | Wilson | Sept. 15, 1953 |
| 2,708,722 | An Wang | May 17, 1955 |
| 2,750,580 | Rabenda et al. | June 12, 1956 |

OTHER REFERENCES

"Electrical Manufacturing," volume 52, issue #4, October 1953, article, "Digital Memory Systems," by I. L. Auerback, pages 100–107.

UNITED STATES PATENT OFFICE

CERTIFICATE OF CORRECTION

Patent No. 2,935,735 May 3, 1960

Robert D. Kodis et al.

It is hereby certified that error appears in the printed specification of the above numbered patent requiring correction and that the said Letters Patent should read as corrected below.

Column 4, line 27, after "input" insert -- , feedback, inhibit --; line 28, strike out "feedback; inhibit".

Signed and sealed this 25th day of April 1961.

(SEAL)
Attest:

ERNEST W. SWIDER
Attesting Officer

DAVID L. LADD
Commissioner of Patents

Notice of Adverse Decision in Interference

In Interference No. 92,066 involving Patent No. 2,935,735, R. D. Kodis, S. Ruhman and S. S. Guterman, Magnetic control systems, final decision adverse to the patentees was rendered July 12, 1963, as to claims 1, 2, 3, 4, 5, 6, 7, 9 and 10.

[*Official Gazette September 3, 1963.*]